UNITED STATES PATENT OFFICE.

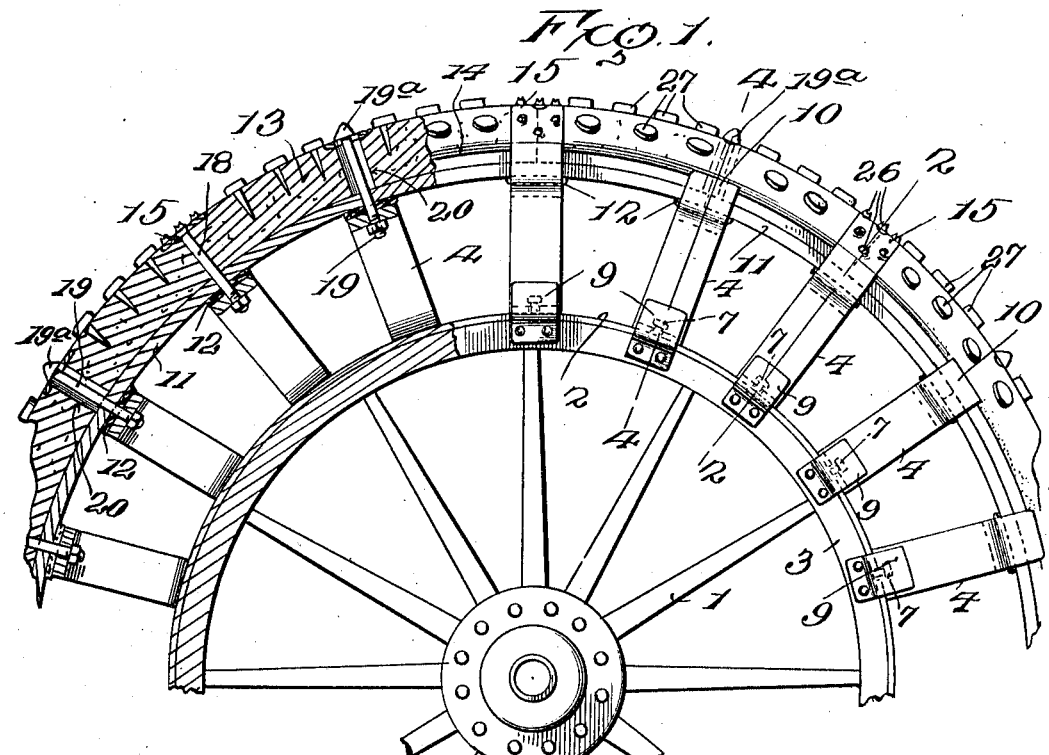

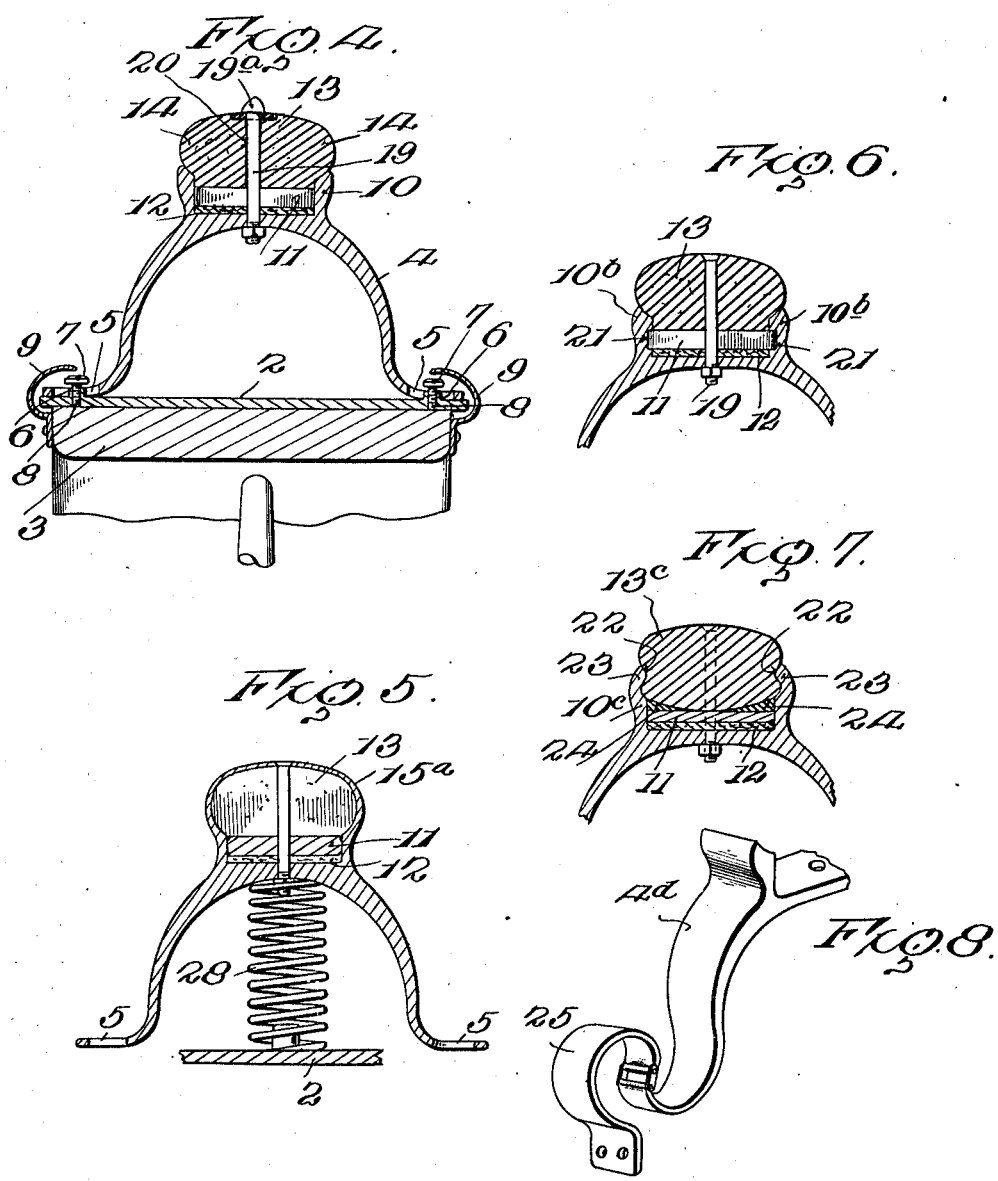

RICHARD A. FALKENBERG, OF SAN FRANCISCO, CALIFORNIA.

RESILIENT TIRE.

1,004,003. Specification of Letters Patent. Patented Sept. 26, 1911.

Application filed February 15, 1910. Serial No. 544,109.

*To all whom it may concern:*

Be it known that I, RICHARD A. FALKENBERG, citizen of the United States, residing at San Francisco, in the county of San Francisco and State of California, have invented certain new and useful Improvements in Resilient Tires, of which the following is a specification.

The present invention comprehends certain new and useful improvements in vehicle wheels, and the invention has for its object an improved spring tire which is designed particularly for use on automobiles or the like and which possesses a maximum resiliency of structure so as to effectually absorb shocks incident to travel.

A further object of the invention is a spring tire that embodies to a marked degree the characteristics of simplicity, durability and strength and that is designed to supersede the ordinary pneumatic tire and obviate its many disadvantages.

A still further object of the invention is a tire of this character in which the component parts are separably connected together so as to be capable of being conveniently detached and replaced by new parts when occasion requires.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which:

Figure 1 is a fragmentary side elevation, partly in section, of a wheel equipped with my improved spring tire; Fig. 2 is a transverse section thereof on the line 2—2 of Fig. 1; Fig. 3 is a detail perspective view of one of the clasps; Fig. 4 is a transverse section on the line 4—4 of Fig. 1; and Figs. 5, 6, 7 and 8 illustrate modifications hereinafter specifically described.

Corresponding and like parts are referred to in the following description and indicated in all the views of the drawing by the same reference characters.

For the purpose of illustration, the invention is shown and described in connection with a wheel 1 that is of substantially conventional form. A metal band or tire 2 is preferably secured around the felly or rim 3 of the wheel and is relatively wider than the same, so as to project laterally on both sides thereof. Mounted on the periphery of the band is an annular series of springs 4 that are disposed transversely with respect to the wheel and are spaced apart circumferentially at suitable intervals. Each of these springs may be of suitable thickness according to the weight of the vehicle on which the tire is to be employed. Intermediate of its ends, the spring is bowed outwardly, as shown, so as to have a substantially arch-shaped contour and to be spaced apart from the wheel. The ends of the spring are turned oppositely laterally and rest against the periphery of the band 2 in proximity to the opposite side edges thereof, said ends being formed with slots 5 through which project studs 6 outstanding from the band 2. The slots are elongated in the direction of the length of the spring, whereby to afford the ends of the spring lateral play with respect to the wheel to permit the bowed intermediate portion to yield inwardly toward the wheel. The ends of the spring are detachably retained on the studs 6 in any suitable manner, as for instance, by means of removable heads 7 having threaded stems 8 engaged in suitably threaded sockets in the studs.

In order to limit the movement of the ends of the spring, a pair of stops 9 is employed, the stops being secured on opposite sides of the rim 3 and curving laterally and outwardly, so as to embrace the adjacent projecting portions of the band 2 and to overhang the corresponding ends of the spring. The stops are preferably not continuous, a separate pair of stops being provided for each spring.

Each spring is provided at its bowed portion with a pair of transversely spaced side members or cheeks 10 which are preferably integral therewith, although not necessarily so. These side members project outwardly from the spring with their inner or opposing faces substantially flat and lying in substantially parallel planes. An annular spring band 11 of steel or the like encircles the series of springs and fits between the side members, so as to be held against lateral displacement. The band is supported between the side members by the bowed portion of the corresponding spring, and in the present instance rests against a pad 12 of rubber or felt that provides a yielding bearing therefor. One of these pads is carried by each spring 4, the series of pads thus preventing the spring band from coming into direct contact with the springs 4, whereby to reduce the noise to a minimum during the operation of the wheel. The spring band 11 forms a support for an annular leather tread 13, the inner portion of which is confined between the outer ends of the side members 10. The outer portion of the tread is extended laterally on both sides, as indicated at 14, in order to afford a relatively wide tread surface, said lateral extensions bearing against the rounded outer edges of the side members 10 (see Fig. 4).

The tread and the spring band are preferably constructed of a plurality of substantially duplicate arcuate sections which are equal in length to the distance between alternate springs 4, the meeting ends of adjacent sections of both the tread and the band forming butt joints. The sections of the tread and the sections of the band break joint, with the joints of the tread sections positioned opposite alternate springs 4 and with the joints of the band sections resting upon the remaining springs. The meeting ends of adjacent tread sections are embraced by a substantially U-shaped metallic clasp 15 which spans the joint between the sections and is preferably slightly countersunk in the peripheries thereof, as shown. The clasp conforms to the cross sectional contour of the tread and fits around the lateral extensions 14 with its extremities offset as indicated at 16, and abutting against opposite sides of the inner portion of the tread and interposed between the same and the adjacent side members 10 (see Fig. 2). The clasp is provided with one or more pairs of inwardly disposed prongs 17, the prongs of each pair being embedded in the respective meeting ends of the tread sections in order to assist in preventing the same from spreading apart. In proximity to its middle point the clasp carries an inwardly disposed threaded stem 18 which is accommodated in matching recesses in the ends of the tread sections and which passes inwardly through suitable openings in the spring band 11 and the corresponding pad 12 and spring 4, a nut working on the inner extremity of the stem and abutting the inner surface of the spring to detachably connect the parts together at this point.

The meeting ends of adjacent band sections are formed with matching recesses for the reception of a bolt 19 which is inserted through an opening 20 formed at the middle point of the over-lying tread section. The bolt 19 passes radially inwardly through the corresponding pad 12 and the bowed portion of the corresponding spring 4 and has a nut mounted on its inner extremity. The opening 20 is shown in Fig. 1 as elongated circumferentially, but it is not believed that this is necessary for the successful operation of the tire.

The clasp 15 is formed with a plurality of outstanding integral projections 26 that coöperate with hobnails 27 secured in the leather tread, so as to insure against skidding. The head 19ª of the bolt 19 is enlarged and outstands from the periphery of the tire to assist in this purpose.

From the foregoing description in connection with the accompanying drawings it will be apparent that I have provided an improved spring tire which embodies to a marked degree the characteristics of simplicity and durability and possesses a maximum resiliency of structure, and which has many other advantages which will at once recommend its general adoption. Attention is particularly directed to the fact that by providing the spring band, a continuous support is afforded for the leather tread, so as to effectually prevent the same from possibly sagging between the springs.

Where the tire is used on a vehicle which is subjected to hard usage and heavy loads, the action of the springs 4 may be supplemented by coiled expansion springs 28 that are interposed between the bowed portions of the respective springs and the metal band 2, (see Fig. 5.)

It is to be understood that it is not necessary that the clasps which span the joints between the sections of the tread, be separate parts, as described and shown in the preferred embodiment of the invention, but, if desired, these clasps may be integral with the corresponding pair of side members, as indicated at 15ª in Fig. 5. In this form of the invention the side members and the clasp constitute a closed loop upon the bowed portion of the spring.

In another embodiment of the invention, as illustrated in Fig. 6, the opposing faces of the side members 10ᵇ, are formed with grooves 21 for the reception of the opposite edge portions of the spring band. Such an arrangement is obviously quite efficient and insures of the spring band being effectually held in place.

In a further embodiment of the invention, the tread 13ᶜ is reversible and has both its inner and outer surfaces curved transversely, as shown in Fig. 7, the tread being formed at its side edges with channels 22 in which fit beads 23 provided at the extended outer ends of the side members 10ᶜ. Packing 24 is interposed between the inner surface of the tread and the spring band in order to compensate for the curved contour of the former and provide a firm bearing therefor.

I have found that it is not necessary that the ends of the springs be slotted and slidably connected to the tire 2, as before described, but if desired, I may employ in lieu of such a connection, the arrangement shown in Fig. 8, wherein the ends of the spring $4^d$ are suspended in members 25 which are attached to the opposite sides of the rim and curve outwardly beyond the periphery thereof, said members being of spring formation so as to admit of the ends of the spring spreading apart freely in the operation of the tire.

Having thus described the invention what is claimed as new is:

1. The combination with a vehicle wheel, of a spring tire including a circumferential series of springs mounted on and outstanding from the felly, the springs being spaced apart circumferentially, an annular tread encircling the series of springs, an annular metallic band also encircling the series of springs and interposed between the springs and the tread and forming a support for the tread, the tread and the band being composed of a plurality of arcuate sections, and the sections of the tread breaking joint with the sections of the band.

2. The combination with a vehicle wheel, of a resilient tire including a circumferential series of springs mounted on the periphery of the felly, each spring being disposed transversely with respect to the felly and being bowed outwardly therefrom intermediate of its ends, the ends of the springs bearing against the periphery of the felly and being slotted, a plurality of studs outstanding from the periphery of the felly and operating in the respective slots to slidably connect the ends of the springs to the felly, a tread encircling the series of springs, and a separate pair of stops applied to opposite sides of the felly in proximity to each spring and outstanding from the periphery of the felly to limit the sliding movement of the ends of the spring.

In testimony whereof I affix my signature in presence of two witnesses.

RICHARD A. FALKENBERG. [L. S.]

Witnesses:
J. C. KERRIGAN,
L. J. WELCH.

---

Copies of this patent may be obtained for five cents each, by addressing the "Commissioner of Patents, Washington, D. C."